Nov. 10, 1953     F. W. SEYBOLD     2,658,346
ROTARY, TURBINE-TYPE FLUID COUPLING
Original Filed July 21, 1951     2 Sheets-Sheet 2
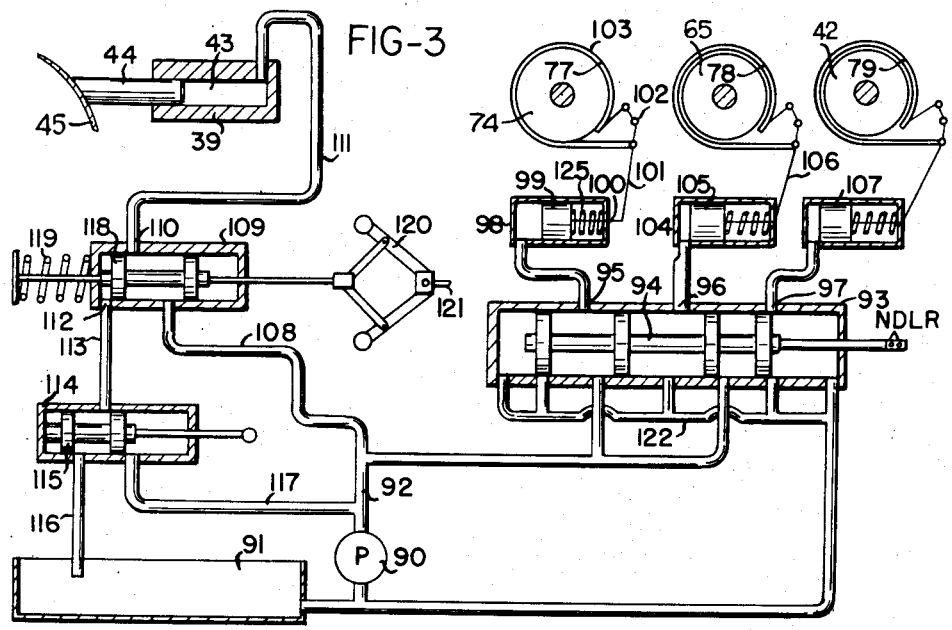
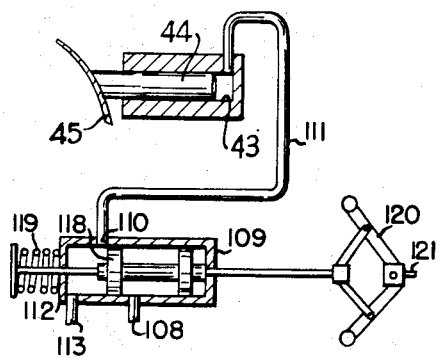
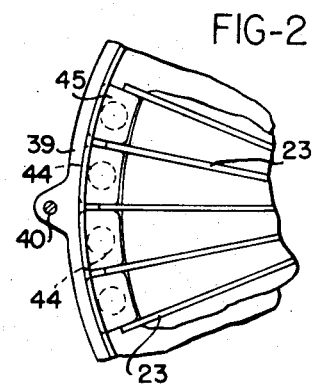
INVENTOR.
FREDERICK W. SEYBOLD
BY
ATTORNEYS Patented Nov. 10, 1953

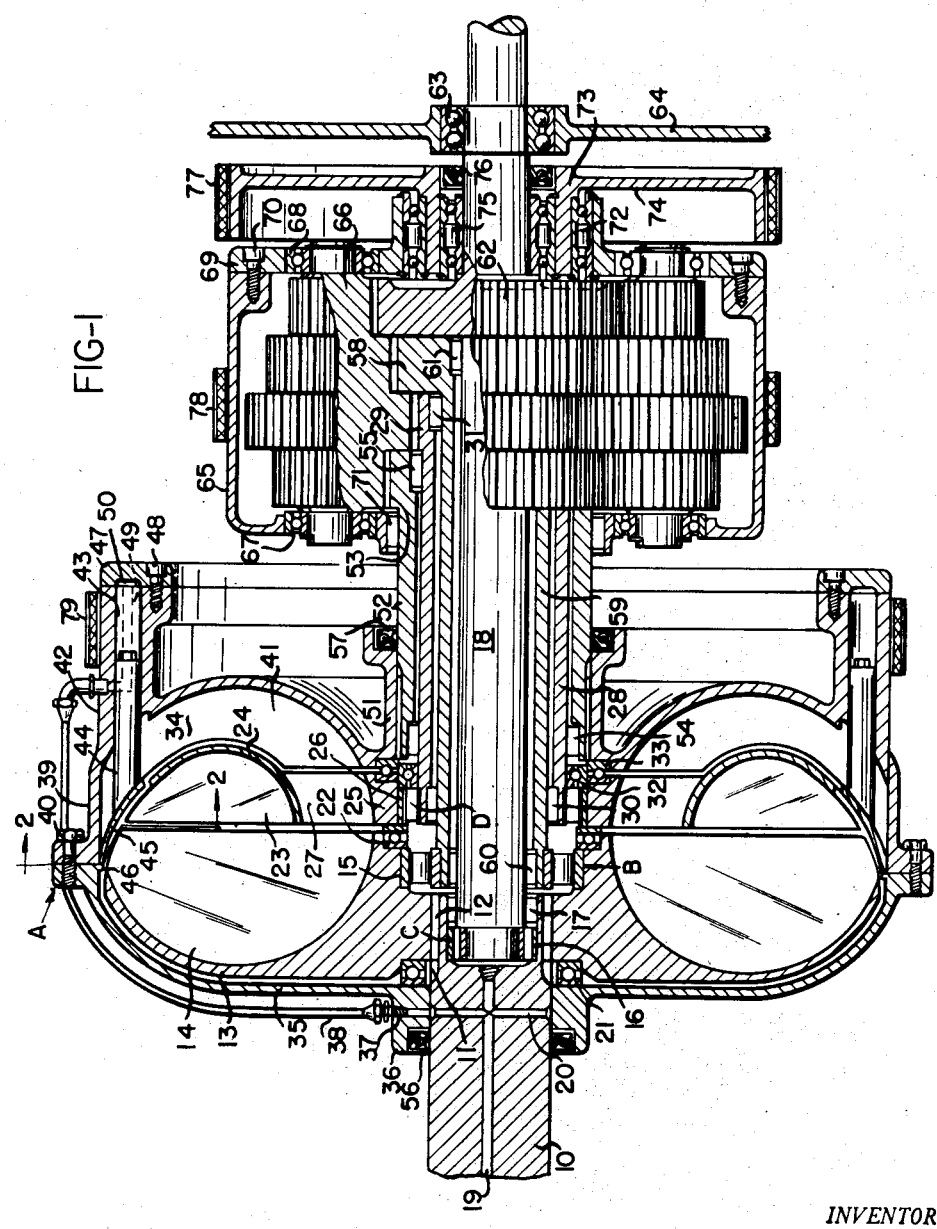

2,658,346

UNITED STATES PATENT OFFICE 2,658,346

ROTARY, TURBINE-TYPE FLUID COUPLING

Frederick W. Seybold, Westfield, N. J.

Original application July 21, 1951, Serial No. 237,974. Divided and this application January 19, 1953, Serial No. 331,793

10 Claims. (Cl. 60—54)

This invention relates to power transmitting devices, particularly to fluid coupling arrangements and combinations thereof with variable speed gearing.

Such transmissions as are referred to above are adapted for mounting between the power plant and the driven shaft of automotive vehicles such as passenger cars, trucks, and military tanks and for other power transmission applications requiring variable speed output.

In particular, variable speed transmissions of this nature, namely, the combination of a fluid drive unit and geared drive unit arranged in series are becoming more or less standard equipment for passenger automobiles. Previous combinations of this nature however, have certain disadvantages in connection with either their construction, maintenance, or operation that render them somewhat less satisfactory than is to be desired.

One particular difficulty encountered with such transmissions is the extreme complexity of the control system and many transmissions in current use have a plurality of brakes, friction clutches, jaw clutches and overrun clutches, at least some of which must be operated in overlapping or precisely consecutive relationship during speed changes of the transmission in order to obtain a reasonably smooth variation in the output speed of the transmission. The controls necessary for accomplishing the shifting of the various clutches and brakes are not only complicated and therefore expensive but are also subject to wear and failure and to becoming out of adjustment.

Whenever control systems of this nature become out of adjustment, and commence to operate improperly for any reason whatsoever, a perceptible shock will take place in the drive train between the power plant and the output shaft which is not only objectionable to the operator and passengers in the vehicle but is also dangerous in that severe loads imposed on the mechanical elements of the drive train might cause failure thereof under certain conditions.

Having the foregoing in mind, it is a primary object of the present invention to provide the combination of a fluid coupling and a geared unit in a transmission characterized by extreme simplicity and smoothness of operation.

A still further object is the provision of a transmission of the nature referred to including a fluid coupling in which the progressive drive ratio transitions are made in a smooth and imperceptible manner.

A particular object of the present invention is to provide a novel design of fluid coupling having a plurality of runners adapted for becoming selectively effective during operation of the coupling whereby at least one speed change of the transmission can be accomplished by shifting the coupling operation from one runner to the other.

A still further object of this invention is the provision of a new type of fluid coupling having multiple runners which are so controlled that at least a part of the change from one gear ratio to another is effected within the fluid coupling.

Another object is to provide a multi-range power transmission having a geared unit and a fluid coupling unit interconnected in which at least some of the speed changes of the transmission are effected within the fluid coupling, and wherein the control of these changes is effected externally of the coupling.

This application is a division of my co-pending application Serial No. 237,974 filed July 21, 1951.

The several objects and advantages referred to above will become more apparent upon reference to the following description taken in connection with the accompanying drawings, in which:

Figure 1 is a vertical longitudinal section through a power transmission constructed according to my invention and having associated therewith the fluid coupling unit with which the present invention is particularly concerned;

Figure 2 is a fragmentary transverse sectional view, taken on line 2—2 of Figure 1 showing a portion of the fluid coupling of this invention;

Figure 3 is a more or less diagrammatic view showing the hydraulic control system for the several brake bands of the transmission and the movable deflectors of the fluid coupling together with the control valve for controlling the transmission; and Figure 4 is a fragmentary view showing the deflectors of the fluid coupling shifted to a different operative position than they occupy in Figure 3.

GENERAL ARRANGEMENT

In general the transmission of this invention comprises the combination of a fluid coupling having an impeller and two runners and a geared unit. The impeller and runners are arranged so that below a predetermined speed of operation the impeller is coupled with only the inner of the runners and above a predetermined speed the impeller is coupled with the outer of the runners, with the inner runner idling. A governor controlled valve is provided so that at a predetermined speed of operation of the engine of the vehicle, the impeller of the coupling is automatically coupled with the outer of the runners and a manual control is also provided whereby the impeller can be maintained coupled to the inner impeller at all engine speeds.

The geared unit that is provided comprises a casing having therein two or more cluster gears, each consisting of a plurality of pinions. A pair of sun gears are provided meshing with certain of the pinions, and these sun gears are connected with the runners of the fluid coupling, with the sun gear associated with the inner one of the runners being connected therewith through an overrunning clutch.

Another of the pinions of the cluster gears meshes with a gear on the output shaft of the transmission. Means are provided for holding the casing which mounts the cluster gears against rotation to give a driving connection between the runner driven sun gears and the output gear, and this means includes an overrunning clutch that permits rotation of the casing for obtaining a high gear ratio.

Still another of the pinions of the cluster gears meshes with a sun gear that has an overrunning clutch between it and the impeller of the fluid coupling, so that, when this last-mentioned sun gear reaches the speed of the fluid coupling impeller, it is locked thereto and provides for an increase in the driving ratio of the transmission.

An auxiliary braking means is provided for locking the housing containing the cluster gears against rotation in either direction, whereby the transmission can be locked in low gear for coasting down hills.

Still another braking means is provided for locking one of the runner driven sun gears against rotation, whereby the transmission can be operated in reverse.

STRUCTURAL ARRANGEMENT

The transmission according to my invention can advantageously be considered by dividing it into eight sub-assemblies, which will now be taken up in order.

1. *The driving assembly*

The driving assembly comprises the drive shaft 10 which is provided with external multiple splines 11 for mating with the internal multiple splines 12 of the impeller 13 of a three-element hydraulic coupling designated by A. The impeller 13 is provided with radial vanes 14 and carries the outer member 15 of an overrunning clutch B. The drive shaft 10 is recessed to receive the outer member 16 of the overrunning clutch C and the anti-friction bearing 17, which supports the output or driven shaft 18. The drive shaft 10 is also provided with passages 19 and 20 for the purpose of conducting pressure oil. The impeller 13 is also recessed for the reception of the thrust bearings 21 and 22 to keep the impeller in correct operating relationship with the other members of the coupling A.

2. *The primary floating assembly*

The primary floating assembly consists of the runner 23 which is composed of the semi-toroidal shell 24 and the hub portion 25, into which is fitted the outer member 26 of an overrunning clutch D. Radial vanes 27 connect the shell 24 and the hub 25. The inner member of the overrunning clutch D is secured to the long sleeve 28 of the driving pinion 29, which is recessed on both ends to receive anti-friction bearings 30 and 31. The hub 25 is also recessed to receive the ball bearings 32 and 33 to provide for radial support and end thrust of the runner 23, respectively.

3. *The secondary floating assembly*

The secondary floating assembly consists of the runner 34, which is composed of three sections. The left-hand section 35 conforms closely to the shape of the impeller 13, and its hub 36 is journaled on the drive shaft 10 and is provided with suitable ports 37 to cooperate with the passages 20 to conduct pressure oil from the hub 36 through the oil pips 38 to the center section 39 of the runner 34. The left hand section 35 is fastened to the center section 39 by a series of screws 40. The runner 34 is provided with radial vanes 41 and an annular extension 42.

Centrally between each pair of vanes and in said annular extension cylindrical bores 43 are provided and into which closely fitted pistons 44 are inserted. Deflector shields 45 are integral with the pistons 44 and are slidably fitted between the vanes 41, and their contour is such as to provide a smooth path to the circulating oil in the coupling. A protrusion 46 on the left-hand section of the runner 35 acts as limiting stop for the deflector shields 45 in their most extended position, in which these deflector shields align with the contour of the semi-toroidal shell 24 and prevent any circulating oil from entering between the vanes 41 of the runner 34.

The third or right-hand section of the runner 34 is the recessed ring 47 which is fastened to the center section 39 by the screws 48. A series of ports 49 conduct the pressure oil which enters from the piping 38 into the recess 50, whereby said oil may readily enter the bores 43 and act on the pistons 44 therein. Likewise when the oil pressure is relieved and the centrifugal force of the circulating oil pushes on the deflector shields 45, the pistons 44 will move to the right and then permit access of the circulating oil in the coupling to the vanes 41 of the runner 34.

The center section 39 has a multiple splined hub 51 which mates with the long sleeve 52 of the pinion 53 which is recessed to receive anti-friction bearings 54 and 55 which are journaled on the long sleeve 28 of the driving pinion 29. Oil seals 56 and 57 are provided to prevent oil leakage.

4. *Direct drive or high ratio assembly*

The direct drive or high ratio assembly consists of the pinion 58 which has a long sleeve portion 59 and is recessed for the reception of anti-friction bearings 60 and 61, which are journaled on the driven shaft 18. The inner portion of the overrunning clutch B is secured to the long sleeve 59 and cooperates with the outer portion which is secured to the impeller 13, so that the pinion 58 cannot overrun the impeller 13. The bearings 30 and 31 of the pinion 29 are also journaled on the long sleeve 59 of the pinion 58.

5. *The driven assembly*

The driven assembly consists of the long driven shaft 18, whose left-hand end is reduced to have secured to it the inner member of the overrunning clutch C which prevents the shaft 18 from overrunning the drive shaft 10, also for "taxi-push" starting of the engine by pushing the car.

To the right of pinion 58 a pinion 62 is secured to the shaft 18 and the right-hand end of the latter is journaled in the ball bearing 63 mounted in the transmission housing 64.

6. *The reaction assembly*

The reaction assembly consists of the rotatable housing 65 in which two or more cluster pinions 66 are mounted on anti-friction bearings 67 and 68. For assembly reasons the housing 65 has a detachable end 69 which is fastened to the housing 65 by the screws 70. The cluster pinions 66 are of suitable proportion, and they mesh, respectively, with the pinions 53, 29, 58 and 62, so that the desired speed ratios are obtained.

Let us assume that the pinion 53 has 48 teeth and its cluster pinion 24 teeth, and pinion 29 and its cluster pinion each have 36 teeth, and pinion 58 has 45 teeth, then its cluster pinion mate will have 27 teeth, and pinion 62 has 54 teeth, then its cluster pinion has 18 teeth.

It is a prerequisite that the sum of the teeth in each gear set be the same, or, in other words, the center distance of each gear set must be the same, if the teeth are straight in all of the four gear sets. In case the teeth are helical, the various gear sets need only have the same center distance for their correct operation.

An anti-friction bearing 71 journals the housing 65 on the sleeve 52 of the pinion 53, and a combination ball bearing and over-running clutch 72 journals the housing 65 on the hub 73 of the brake wheel 74, the latter being journaled by the combination ball and overrunning clutch 75 on the driven shaft 18.

An oil seal 76 is mounted in the hub 73 of the brake wheel 74 to prevent oil leakage.

7. *The control assembly*

The control assembly comprises a source of pressure oil usually secured from a gear pump driven by the engine and which, when controlled by a suitable manually or automatically operated valve can be applied to the actuating pistons of the control mechanism.

The fluid supply to pistons 44 is preferably controlled by a governor operated valve, which, when the vehicle has attained a certain definite speed, will shift and relieve the oil pressure in the bores 43, so that the pistons may recede from their extended position and permit entry of the circulating oil in the coupling to the vanes 41 of the runner 34. Under certain driving conditions, it may be desirable to overrule the governor operated valve and continue the setting of the transmission in the lower speed ratio, which may be accomplished by manual actuation of said valve or by-passing if the valve.

A brake band 77 for braking the brake wheel 74 is actuated by well-known means, such as a fluid operated piston acting on the free end of a brake band, whereby the rotation of the reaction assembly in a direction opposite to that of the drive shaft is prevented; but the overrunning clutch 72 will permit the rotation of the reaction assembly in the same direction as that of the driven shaft 18.

A brake band 78, when applied to the housing 65, will prevent its rotation in either direction and is mostly used for hill braking or heavy, long pulls in low gear ratio.

A brake band 79 when applied to the annular extension 42 will brake the runner 34 and pinion 53 for reverse operation of the transmission.

8. *The no-roll-back assembly*

To prevent the vehicle from rolling backward when it has stopped on an incline and the setting of the transmission is for forward operation the overrunning clutch 75 is provided between the driven shaft 18 and the brake wheel 74. This clutch 75 prevents the driven shaft 18 from rotating backwards as long as the brake wheel 74 is held by the brake band 77 and, of course, does not interfere with the forward rotation of the said shaft 18.

When the transmission is conditioned for reverse operation, the brake 77 is released and allows reverse rotation of brake wheel 74, as well as that of the reaction assembly when the brake band 79 is applied.

The control assembly, referred to above, and which includes the several bands that lock up the various parts of the transmission and the plungers 44, which actuate the deflector shields 45, includes valve mechanism which will be seen in Figure 3. In this figure the pump that operates pressure fluid for actuating the bands is indicated at 90 and draws fluid from a recervoir 91 to discharge it into a pressure conduit 92. The pressure conduit leads to a control valve casing 93, having therein the reciprocable valve member 94.

Casing 93 is provided with a plurality of service ports 95, 96, and 97. Port 95 is connected with cylinder 98, having therein piston 99 connected with rod 100 that is pivotally secured to one end of a lever 101 that is pivoted at 102.

A connection on one side of pivot 102 is made with resilient outer band 103 of brake band 77 and a connection below the said pivot is made with the opposite end of the resilient band 103. The arrangement is such that a small angular movement of the arm will bring about quick application of the brake band to the drum and, likewise, a small movement of the arm in the opposite direction will provide clearance between the band and the drum.

The actuating piston 99 is preferably urged in its band opening direction by a spring 125, so that pressure fluid need be supplied to cylinder 98 only for applying the band.

Similarly associated with band 78 which locks casing 65 when energized is a cylinder 104 having therein a piston 105 connected by rod 106 with the actuating means for the band, this means being the same as that described in connection with band 77. Cylinder 104 is connected to receive pressure fluid from port 96 of the control valve.

Port 97 of the valve is similarly connected with cylinder 107 pertaining to the actuating mechanism for band 79 that locks up the outer runner of the fluid coupling and its associated pinion when energized.

Pump 90 also discharges pressure fluid through a conduit 108 to port in casing 109 of the governor controlled valve that has a service port 110 connected by conduit 111 with the cylinders in which pistons 44 are mounted.

Casing 109 has another port at 112 connected by conduit 113 with a port in casing 114 of a manual control valve. The manual control valve has a valve member 115 adapted for manual actuation betwen a normal position where conduit 113 is connected with exhaust conduit 116 and a second position where conduit 113 is connected with pressure conduit 117 leading to the discharge side of pump 90.

The governor control valve also has a valve member 118 normally urged by a spring 119 in a position to interconnect conduits 108 and 111. A governor, such as the fly ball mechanism indicated at 120, is connected for being driven as by the shaft 121 and at a predetermined speed of rotation will move valve member 118 into position to interconnect conduits 111 and 113. Shaft 121 may be engine driven or may be driven at a speed corresponding to the speed of the vehicle, or other load being powered by the transmission.

Valve member 94 of the control valve for the bands 77, 78, and 79 has four positions into which it can selectively be adjusted manually. This is preferably done by means of a shift lever in the steering column or by any other suitable arrangement that will be convenient for the operator.

In its first position, identified by letter "N," which is neutral, all of ports 95, 96, and 97 are connected with the exhaust manifold 122 that leads back to reservoir 91.

The next position of the valve member 94, where the member is moved to "D" position, and with the valves so shifted that pressure fluid is delivered to port 95 pertaining to band 77 so that the said band is energized, while the other bands 78 and 79 remain de-energized.

The transmission is now in drive ratio, and at a predetermined sped the governor valve shifts to the position illustrated in Figure 4, and this permits deflector shields 45 and their pistons 44 to move to a position where fluid will be admitted to the outer runner.

The third position for valve member 94 is marked "L," and in this position both bands 77 and 78 are energized by a supply of pressure fluid to their ports 95 and 96. With the valve in this position, housing 65 of the cluster gears is locked and the transmission is forced to operate in low gear, thus providing a safety factor for coasting down long hills.

The last position that the valve member 94 can occupy is identified "R," and this is the position for reverse operation of the transmission, and at that time port 97 for band 79 receives pressure fluid, while ports 95 and 96 of the other bands are connected to exhaust.

At this time the governor valve is shifted to its Figure 3 position so that only the inner runner is effective. In certain instances it might be desirable to provide an arrangement for automatically forcing plungers 44 and deflector shields 45 outwardly whenever band 79 is energized. This could readily be accomplished by providing a pilot arrangement on the overruling valve, which would shift its valve member 115 to overruling position whenever port 97 of band 79 was subjected to pressure.

OPERATION

Idling or "neutral" position

For "neutral" operation of the transmission, a suitable control lever on the steering wheel post will be set into the "neutral" position, whereby the control valve will be set so that all three brake bands are released, but pressure oil will be applied to the pistons 44 so that the deflector shields 45 will be held against the stops 46.

The driven shaft 18 is now stationary and with the gear ratios as stated above, and with the runner 23 and pinion 29 turning with the impeller 13, the reaction assembly will turn in the opposite direction at half the speed of the runner 23, and the runner 34 and pinion 53 will turn in the same direction at one-fourth the speed of the runner 23, and the pinion 58 also turns in the same direction, but at two-fifths the speed of the runner 23.

Forward motion in "low" gear

To produce forward motion in "low" gear, the control lever is shifted into the "drive" position, whereby the valve is set to deliver pressure oil to the brake cylinder which applies pressure to the free end of the brake band 77 to stop the reaction member from rotating backwards and cause the runners 23 and 34 to come to a stop because the output shaft 18 is still stationary, due to the application of the foot or parking brake.

Upon release of the brake and depression of the accelerator, the runner 23 will speed up, and through pinion 29, cluster gears and pinion 62 will drive the output shaft 18 at reduced speed but increased torque. As previously assumed, the pinion 29 and its mating cluster pinion have each 36 teeth, the output shaft pinion 62 has 54 teeth, and its cluster pinion mate has 18 teeth. Therefore, when the housing 65 is at rest, the shaft 18 turns at one-third the speed of the runner 23, but its torque is three times as great.

The speed of the runner 34 is now half the speed of the runner 23, and the pinion 58 turns at three-fifths the speed of the runner 23.

Forward motion in "intermediate" gear

As the car speed increases to, say, approximately ten miles per hour, the governor will shift the valve into the position whereby the oil pressure is relieved in the pipe lines 19, 20, 38, 49, and so that the centrifugal force of the circulating oil in the coupling will push on the deflector shields 45 and force the pistons 44 to the right and permit entrance of the circulating oil into the vanes 41 of the runner 34, which will accelerate its speed and the drive will now be taken over by the pinion 53 and the runner 23 will idle along with the impeller 13, but the pinion 29 will turn faster, and this is accommodated by the overrunning clutch D.

The pinion 58 being smaller in size than 53, also rotates faster, so that when the runner 34 and pinion 53 rotate at five-sixths engine speed, the pinion 58 will rotate at engine speed.

The speed of the output shaft 18 will then be five-ninths that of the engine, but its torque will be one and one-half times that of the input shaft 10.

Forward motion in "high" gear

The overrunning clutch B will prevent the pinion 58 from turning faster than the input shaft 10, so that when the pinion 53 turns at a speed in excess of five-sixths engine speed, the cluster pinion housing will be compelled to turn in the same direction as the input shaft 10, this being permitted by the overrunning clutch 72 without releasing the brake band 77, and, as a result, the output shaft speed will be increased.

As the speed of the runner 34 approaches the speed of the impeller 13, the speed of the output shaft 18 also increases. For example, if the runner 34 has two per cent slip, the speed of the output shaft 18 will be ninety-four per cent of the input shaft speed for the gear proportions stated above.

It should also be noted that the torque capacity of the hydraulic coupling must be two and two-thirds times the maximum engine torque because the pinion 58 "feeds back" a large portion of the "circulating" torque of the coupling, i. e., if the engine torque is taken as unity, then the pinion 58 "feeds back" one and two-thirds times engine torque to the impeller 13, where it is added to the engine torque.

Therefore, two and two-thirds engine torque is transmitted to the runner 34 and pinion 53. The latter delivers through the cluster pinions unity engine torque to pinion 62 on the output shaft 18 and one and two-thirds engine torque to pinion 58, which "feeds" it back through the overrunning clutch B to the impeller 13.

When the speed of the car is reduced due to increased torque demand, the cluster pinion housing 65 will come to a halt and its counter rotation will be prevented by the overrunning clutch 72, and the brake band 77, which is continuously applied as long as the transmission is conditioned in the "drive" position, and then torque multiplication again takes place.

*Down-hill braking*

When descending steep hills, the car could attain excessive speed, unless the brakes are applied, because there is no direct mechanical connection between the output and input shafts and the cluster pinion housing 65 cannot be held by the brake 77 in the forward rotation.

For these reasons the brake band 78 is provided which is capable of stopping the rotation of said housing and compelling the transmission to operate in the low gear ratio where the engine can be effective in braking the car.

*Reverse operation*

To produce "reverse" operation of the transmission, the control lever is moved to the "reverse" position. The brake band 79 will be applied, and the brake bands 77 and 78 will be free, pressure oil being delivered into its brake cylinder, stopping the rotation of the runner 34 and pinion 53. Pressure oil will also force the pistons 44 with the deflector shields 45 to the left against the stops 46.

When the engine is speeded up, the runner 23 will be accelerated and pinion 29 will cause the housing 65 with its cluster pinions to planet around the now stationary pinion 53 at the same speed, but in the opposite direction from that of the driving pinion 29. The output shaft 18 will now turn in "reverse" at one-third the speed of the pinion 29 and the output torque is now three times that of the input shaft.

The "no-roll-back" overrunning device 75 is automatically rendered ineffective because the housing 65 turns three times faster in the same direction as the output shaft 18.

From the foregoing, it will be seen that my invention provides for an automatic transmission having multiple speed ranges which makes it suitable for passenger type automotive vehicles and the like, which is of extreme simplicity, and in which all timed and overlapped shifting of clutches and brakes is eliminated.

The net result is a transmission that can be produced economically, serviced easily, and in which the changes from one speed ratio to another take place without any perceptible shock in the drive train.

It will be understood that I do not wish to be limited to the exact proportions, ratios, and other factors specifically set forth in the foregoing description and the accompanying drawings, but desire to comprehend such changes thereof as may be further desirable to adapt my invention to different conditions and usages.

I claim:

1. In a transmission of the nature described, an input member, a pair of output members, a fluid coupling having an impeller connected to said input member and having first and second runners respectively connected with said output members, deflector means in said coupling for deflecting the fluid pumped by the impeller into one of said runners or for permitting the fluid to enter the other of the runners, fluid operated plunger means adapted for holding said deflector means in its deflecting position, a source of pressure, valve means normally positioned to connect said source of pressure with said plunger means, and speed responsive means arranged for shifting said valve into position to exhaust said plunger means.

2. In a transmission of the nature described, an input member, a pair of output members, a fluid coupling having an impeller connected to said input member and having first and second runners respectively connected with said output members, deflector means in said coupling for deflecting the fluid pumped by the impeller into one of said runners or for permitting the fluid to enter the other of the runners, fluid operated plunger means adapted for holding said deflector means in its deflecting position, a source of pressure, valve means normally positioned to connect said source of pressure with said plunger means, speed responsive means arranged for shifting said valve into position to exhaust said plunger means, and auxiliary valve means adjustable for preventing the exhausting of said plunger means.

3. In a hydraulic coupling; an impeller, and inner runner and an outer runner in said coupling, deflecting shield means positioned about the outer periphery of the inner runner and movable axially of the coupling, said deflector means in its inner position deflecting the fluid pumped by the impeller into the inner runner and in its outer position permitting the fluid to enter the outer runner, fluid operated plunger means connected to said deflector means, and means for supplying pressure to said plunger means to move the deflector means to its inner position, or to exhaust fluid from said plunger means, whereby the pressure of the fluid pumped by the impeller will move the deflector means to its outer position.

4. In a fluid coupling; an impeller, inner and outer runners in said coupling comprising substantially concentric shell portions and blades thereon, and deflecting shield means carried by said outer runner having a first position where it extends from the exit edge of the shell of the impeller to the entrance edge of the shell of the inner runner whereby fluid pumped by the impeller enters only the inner runner, and said deflector shield means also having a second position where it forms a part of the wall defined by the shell of the outer runner whereby the fluid pumped by the impeller enters the outer runner.

5. In a fluid coupling; an impeller, inner and outer runners in said coupling comprising substantially concentric shell portions and blades thereon, and arcuate deflector shields carried by the outer runner between the blades thereof having retracted positions where they are disposed within recesses provided therefor in the shell of the outer runner and inner positions where they extend from the edge of the impeller to the edge of the inner runner to deflect the fluid from the impeller into the inner runner.

6. In a fluid coupling; an impeller, inner and outer runners in said coupling comprising substantially concentric shell portions and blades thereon, and arcuate deflector shields carried by the outer runner between the blades thereof having retracted positions where they are disposed within recesses provided therefor in the shell of the outer runner and inner positions where they extend from the edge of the impeller to the edge of the inner runner to deflect the fluid from the impeller into the inner runner, an axial plunger extending from the back of each shield, and axial bores in the shell of the outer runner receiving said plungers.

7. In a fluid coupling; an impeller, inner and outer runners in said coupling comprising substantially concentric shell portions and blades thereon, and arcuate deflector shields carried by the outer runner between the blades thereof having retracted positions where they are disposed within recesses provided therefor in the shell of the outer runner and inner positions where they extend from the edge of the impeller to the edge of the inner runner to deflect the fluid from the impeller into the inner runner, an axial plunger extending from the back of each shield, and axial bores in the shell of the outer runner receiving said plungers, said bores being hydraulically interconnected for receiving pressure fluid to actuate said plungers in unison to move the shields to their said inner positions.

8. In a fluid coupling; an impeller, inner and outer runners in said coupling comprising substantially concentric shell portions and blades thereon, and arcuate deflector shields carried by the outer runner between the blades thereof having retracted positions where they are disposed within recesses provided therefor in the shell of the outer runner and inner positions where they extend from the edge of the impeller to the edge of the inner runner to deflect the fluid from the impeller into the inner runner, said shell of the outer runner comprising shoulder means to abut and halt said shields in their said inner positions.

9. In a fluid coupling; and impeller, inner and outer runners in said coupling comprising substantially concentric shell portions and blades thereon, and arcuate deflector shields carried by the outer runner between the blades thereof having retracted positions where they are disposed within recesses provided therefor in the shell of the outer runner and inner positions where they extend from the edge of the impeller to the edge of the inner runner to deflect the fluid from the impeller into the inner runner, an axial plunger extending from the back of each shield, and axial bores in the shell of the outer runner receiving said plungers, a source of fluid pressure, and governor controlled valve means operable to connect said source to said bores below a predetermined governor speed and to connect the bores to exhaust above said predetermined speed.

10. In a fluid coupling; an impeller, inner and outer runners in said coupling comprising substantially concentric shell portions and blades thereon, and arcuate deflector shields carried by the outer runner between the blades thereof having retracted positions where they are disposed within recesses provided therefor in the shell of the outer runner and inner positions where they extend from the edge of the impeller to the edge of the inner runner to deflect the fluid from the impeller into the inner runner, an axial plunger extending from the back of each shield, and axial bores in the shell of the outer runner receiving said plungers, a source of fluid pressure, and governor controlled valve means operable to connect said source to said bores below a predetermined governor speed and to connect the bores to exhaust above said predetermined speed, there being also a selectively operable valve for maintaining a supply of pressure to said bores independently of the operation of said governor controlled valve means.

FREDERICK W. SEYBOLD.

References Cited in the file of this patent

UNITED STATES PATENTS

| Number | Name | Date |
|---|---|---|
| 2,536,842 | Duffield | Jan. 2, 1951 |
| 2,548,272 | Seybold | Apr. 10, 1951 |
| 2,627,724 | Seybold | Feb. 10, 1953 |